United States Patent [19]
Meadow

[11] 4,069,302
[45] Jan. 17, 1978

[54] PURIFICATION OF SULFUR

[75] Inventor: Morton Meadow, Trenton, N.J.

[73] Assignee: FMC Corporation, Philadelphia, Pa.

[21] Appl. No.: 718,952

[22] Filed: Aug. 30, 1976

[51] Int. Cl.² ............................................. C01B 17/04
[52] U.S. Cl. .................................. 423/575; 423/578 R
[58] Field of Search ...................... 423/567, 575, 578; 23/267 S, 308 S

[56] References Cited

U.S. PATENT DOCUMENTS

| T560,904 | 3/1975 | Fonseca et al. | |
| 3,598,529 | 8/1971 | Deschamps et al. | 423/575 |
| 3,862,335 | 1/1975 | Renault et al. | 423/578 |
| 4,002,788 | 1/1977 | Demay | 423/578 |

FOREIGN PATENT DOCUMENTS

| 1,905,115 | 8/1970 | Germany. |
| 4,646 of | 1902 | United Kingdom. |
| 952,502 | 3/1964 | United Kingdom. |

*Primary Examiner*—G. O. Peters
*Attorney, Agent, or Firm*—George F. Mueller; Frank Ianno

[57] ABSTRACT

Sulfur produced by the reaction of hydrogen sulfide and sulfur dioxide in the presence of organic solvent solutions of alkali or alkaline earth metal salts of carboxylic acids is contaminated with these carbonaceous materials. The sulfur is purified by washing with water at elevated temperatures to reduce the carbonaceous material content to 0.007% carbon, by weight.

7 Claims, No Drawings

PURIFICATION OF SULFUR

This invention relates to the purification of sulfur recovered from sulfur-containing gases and more particularly sulfur produced by contacting gases containing small proportions of hydrogen sulfide and sulfur dioxide, such as, for example, tail gases from the Claus or equivalent processes, with an organic solvent containing a catalyst for the reaction between the hydrogen sulfide and sulfur dioxide.

In the commercial production of carbon bisulfide, for example, by the reaction of a hydrocarbon with sulfur, large quantities of hydrogen sulfide are also produced. In order to recover the sulfur from the hydrogen sulfide, several processes are available. One common practice is known as the Claus process. In this process the separated hydrogen sulfide which may contain small proportions of carbon bisulfide and carbonyl sulfide is incinerated in such a manner so that one third of the hydrogen sulfide is converted to sulfur dioxide. The incinerated gases are passed through a catalyst-packed reaction chamber where the hydrogen sulfide and sulfur dioxide react to form sulfur and water vapors. The effluent is passed downwardly in a shell and tube heat exchanger where the sulfur is condensed to liquid sulfur. The gases are then passed through a second reaction chamber to effect further reaction of the effluent hydrogen sulfide and sulfur dioxide and recovery of sulfur. The tail gases, even after two or more catalytic stages, include, aside from particulate sulfur, sulfur containing compounds such as hydrogen sulfide, sulfur dioxide and carbonyl sulfide as well as nitrogen, carbon dioxide and water vapor.

Because of the restrictive air pollution standards, the tail gases from a Claus converter, for example, cannot be discharged into the atmosphere. Also, from an economic standpoint, it is desireable to recover the appreciable amounts of sulfur contained in the tail gases. One commercial method being utilized in the treatment of such tail gases to recover sulfur and to reduce the amount of sulfur containing compounds in the gases is described in U.S. Pat. No. 3,598,529. This method includes contacting the tail gases with an organic solvent containing a catalyst for the reaction between hydrogen sulfide and sulfur dioxide at temperatures between about 120° C and about 180° C, preferably between 120° C and 140° C.

The organic solvent is inert to the sulfur containing compounds in the tail gases, is a liquid or relatively low volatility and stable at the temperatures used. As set forth in the aforesaid patent, the solvent may be selected from a wide range of organic solvents such as high molecular weight alcohols, ethers and esters, preferably alkylene glycols, esters and ethers thereof, polyalkylene glycols, esters and ethers thereof, alkylene glycol ether-esters. Examples of satisfactory solvents are ethylene glycol, polyethylene glycols such as polyethylene glycol having a molecular weight of about 400, monoacetate of hexaethylene glycol monopropyl ether, monobutyrate of hexaethylene glycol monopropyl ether, polypropylene glycols, polybutylene glycols, polyethylene glycol monoethyl ether, and the like. Small proportions of water may be present.

The catalyst consists of an alkali metal or alkaline earth metal salt of acyclic, alicyclic, aromatic and heterocyclic monocarboxylic and polycarboxylic acids. Examples of satisfactory salts are, for example, sodium and potassium salts of acetic, citric, propionic, caproic, malonic, glutaric, adipic, acrylic, maleic, tartaric, cyclohexane dicarboxylic, benzoic, ortho phthalic and salicyclic acids. The salt is used in a catalytic amount and may vary from about 1 g. to about 50 g. per kg. of solvent.

In general, the tail gases from a Claus unit or converter will contain from about 1% to about 5% of hydrogen sulfide and sulfur dioxide in a ratio of about 1.5 to about 2.5 parts of hydrogen sulfide to 1 part of sulfur dioxide. The tail gas is passed upwardly through a contact column containing plates or packing and the organic solvent containing a catalytic amount of the catalyst, such as, for example, polyethylene glycol having a molecular weight of about 400 and from 1 g. to 10 g. of sodium or potassium benzoate or salicylate, is passed downwardly. The inlet gases may be at a temperature of from about 120° to about 140° C and the solution and column maintained at a temperature of about 130° C. The solution and sulfur produced by the reaction collects at the bottom of the column where the sulfur is withdrawn and the solution is recycled to the solvent-catalyst supply.

The recovered sulfur because of the intimate contact with the organic substances, contains small proportions of carbonaceous material, principally the organic solvent. Accordingly, the recovered sulfur cannot be recycled for the production of carbon bisulfide. The presence of the carbonaceous material results in the formation of carbonaceous deposits and causes a premature plugging of sulfur vaporizing equipment such as conventional tubular equipment wherein the sulfur is converted from the liquid phase to a vapor phase.

The present invention provides a method of removing carbonaceous materials from sulfur containing such materials, the sulfur having been produced by the reaction of hydrogen sulfide and sulfur dioxide in the presence of an organic solvent and a catalyst consisting of an alkali or alkaline earth metal salt of a carboxylic acid.

In accordance with this invention, carbonaceous materials are removed from sulfur produced as described by washing the liquid sulfur with water at temperatures between about 120° and about 140° C under a sufficient pressure, about 30 psi to about 50 psia, so as to maintain the water in liquid state. In general, the untreated sulfur recovered from the described catalytic process contains carbonaceous materials equivalent to at least 0.02% carbon. In the washing procedure of the present method, contact time between the liquid sulfur and water should be sufficient so as to reduce the carbonaceous material to not more than about 0.007% carbon.

The contact time will be dependent upon the temperature and pressure conditions; whether the treatment is batch or continuous; the desired purity of the sulfur; and, the specific equipment used and the manner in which contact between the liquid sulfur and water is effected.

In a batch operation, a predetermined amount of sulfur may be introduced into a suitable autoclave and water heated under pressure then added in an amount up to 100% by weight of the sulfur, preferably between about 30% and about 50% by weight of the sulfur. The pressure in the autoclave is maintained sufficiently high so that, at the temperature employed (between about 120° and about 140° C), the water and sulfur remain in liquid state. Agitation of the mixture may be effected by means of a suitable agitator or by rocking or shaking the autoclave. After the desired washing period, the autoclave may be cooled to a temperature below 100° C., the water drained off and the sulfur melted and removed. Alternatively, agitation or rocking can be arrested and the liquid sulfur withdrawn before cooling and removing the water.

Alternatively, liquid sulfur may be introduced through a foraminous manifold adjacent the top of a suitable tower and heated water introduced through a foraminous manifold adjacent the bottom of the tower. The droplets of sulfur emerging from the foraminous manifold pass downwardly through the rising water and coalesce into a body of purified liquid sulfur at the bottom of the tower and may be continuously withdrawn. The water percolates through a portion of the liquid sulfur, rises in the tower and may be continuously withdrawn at the top of the tower.

As a further alternative, liquid sulfur may be supplied to the bottom of a suitable tank which is equipped with a high speed agitator. Heated water is supplied to the top of the tank. The tank is provided with a discharge pipe at a point where agitation provides an intimate mixture of sulfur and water. The mixture is continuously withdrawn and passed to a settling tank wherein the sulfur settles and coalesces and the liquid sulfur then withdrawn. The water is withdrawn from a point above the liquid sulfur.

It is obvious that in these continuous procedures the sulfur and water are maintained at the desired temperatures and pressures during the contact period. Upon discharge, the sulfur and water pass through suitable pressure reducing valves and the water cooled. In all instances, the water containing the dissolved organic solvent and small proportions of catalyst is recycled to the catalyst supply to the contact column. The ability to recycle the wash water thereby eliminates a pollution problem (chemical oxygen demand) which would result from discharging the wash water containing the organic substances into a plant effluent.

Accordingly, the treatment of the tail gases from the Claus ovens reduces air pollution and the recycling of the sulfur wash water in the treatment of the tail gases eliminates a water pollution problem.

The following experimental procedures illustrate the unsuitability of sulfur recovered from the treatment of tail gases by the use of organic solvent solutions of the catalyst, such as, polyethylene glycol having a molecular weight of 400 and potassium salicylate, and the effectiveness of the water washing procedure applied to such recovered sulfur.

In the sulfur vaporization experiments described below, the equipment consisted of an open, steam-jacketed sulfur melter and feed reservoir. The vaporizer tube consisted of a 36 inch length of Type 310 Stainless Steel, ¾ inch IPS, Schedule 40 pipe. One end of the pipe was to a sulfur feed reservoir through a heated regulated valve while the opposite end of the tube was connected to a vertical, steam-jacketed condenser. Steam pressure for both the reservoir and the condenser was supplied at 55–60 psig. The 36 inch vaporizer tube was fitted with an internal thermowell adjacent to both ends. The tube was heated by means of two 18-inch electric furnaces controlled by a proportional temperature controller activated by thermocouples placed in the thermowells. The controller was set at 650° C. The sulfur, heated to 140° C, was introduced into the tube through the heated regulating valve, was vaporized in the tube and condensed in the steam-jacketed condenser from which it was collected.

EXAMPLE I

A sample of sulfur recovered from tail gases by the use of a solution of polyethylene glycol having a molecular weight of 400 contained 0.021 - 0.029%, by weight, of carbon. The sample was fused and passed through the vaporization tube as described above for 2.5 hours at a rate of about 600 g/hr and the condensed sulfur collected. Although the sulfur sample exhibited a foul odor, the recovered sulfur was free of this odor. The collected sulfur had about 0.002%, by weight, of carbon. After the tube had been allowed to cool, it was cut into four 9-inch sections. The first two sections wherein the sulfur was passing through a temperature transition from 140° C to 650° C were coated with a layer of scale about 1/16 inch thick. The scale waas carbonaceous in nature and was unlike any other scale previously encountered in sulfur vaporizations.

EXAMPLE II

A sample of a conventional sulfur (Freeport Superbrite) was fused and stirred overnight with a polyethylene glycol (Carbowax 400). The treated sulfur was then vaporized and collected as described in Example I. Freeport Superbrite sulfur contains between about 0.005% and about 0.023%, by weight, of carbon. The treated sulfur contained about 0.03%, by weight, or carbon. The condensed sulfur contained <0.002%, by weight, carbon. The vaporization tube when cut into sections exhibited the same amounts of scale as described in Example 1. Freeport Superbrite sulfur when passed through the vaporization tube as described above did not result in a deposition of scale.

EXAMPLE III

A 200 g sample of recovered sulfur as described in Example I together with 74 g of water were placed in a 300 ml stainless steel bomb and the bomb sealed and heated to 140° C. The heated bomb was shaken for 38 minutes. After cooling, the water was poured off and the sulfur subsequently heated to about 125° C. and poured off. The starting sulfur contained about 0.03%, by weight, of carbon and exhibited a foul odor. The washed sulfur contained 0.007%, by weight, of carbon but did not exhibit a foul odor. The recovered wash water contained 320 ppm of carbon. The washed sulfur was subjected to the vaporization-condensation cycle as described above. Inspection of the sectioned vaporization tube revealed an absence of of carbonaceous deposits. The condensed sulfur contained 0.003%, by weight, of carbon.

EXAMPLE IV

Example III was repeated using 800 g of recovered sulfur to 300 g of water. The results were substantially the same as Example III, however, small traces of a carbonaceous deposit were found in the vaporization tube.

It is apparent that upon separation of liquid sulfur from the washing procedures and allowing it to be under atmospheric pressure, water present will flash off. Sulfur recovered by the catalytic treatment of tail gases from the Claus and equivalent process and subjected to the above described washing procedures has a purity of 99.99%. Sulfur of such purity may be used in conventional sulfur vaporization equipment without adverse effects on the operation of the equipment.

What is claimed is:

1. The method of removing carbonaceous materials from sulfur produced by the reaction of hydrogen sulfide and sulfur dioxide in the presence of an organic solvent solution of an alkali metal or alkaline earth metal salt of a carboxylic acid at a temperature between about 120° and about 140° C. whereby the sulfur is in liquid state which comprises separating the liquid sulfur from the organic solvent solution, thereafter contracting the sulfur in liquid state with water at a temperature of between about 120° C. and about 140° C. under pressure for a period sufficient so as to reduce the carbonaceous material content of the sulfur to not more than about 0.007% carbon by weight and recovering the sulfur.

2. The method as defined in claim 1 wherein the amount of water is from about 30% to 50% by weight of the sulfur.

3. The method as defined in claim 1 wherein the sulfur and water are introduced into an autoclave and are agitated for a period sufficient so as to reduce the carbonaceous material content of the sulfur to not more than about 0.007% carbon by weight and separating the sulfur from the water.

4. The method as defined in claim 3 wherein the sulfur is withdrawn from the autoclave, the water is cooled below 100° C. and thereafter withdrawn.

5. The method as defined in claim 3 wherein the water and sulfur is cooled to solidify the sulfur, the water is withdrawn, the sulfur is melted and thereafter withdrawn.

6. The method as defined in claim 1 wherein the water and the liquid sulfur is introduced into a tower, the water and sulfur agitated to provide an intimate mixture of water and sulfur, withdrawing the intimate mixture, passing the mixture into a settling tank, allowing the sulfur to settle and coalesce, withdrawing the coalesced liquid sulfur from the bottom of the tank and withdrawing the water from the top of the tank.

7. The method as defined in claim 6 wherein the water is introduced at the top of the tower and the liquid sulfur is introduced at the bottom of the tower.

* * * * *